United States Patent [19]
Perry, Jr.

[11] Patent Number: 5,447,433
[45] Date of Patent: Sep. 5, 1995

[54] LEARNING SYSTEM WITH INTERLOCKING HEXAGONAL CONTROL STRUCTURES

[76] Inventor: Cecil M. Perry, Jr., 211 Basswood, Spring, Tex. 77386

[21] Appl. No.: 111,593

[22] Filed: Aug. 17, 1993

[51] Int. Cl.⁶ ............................................. G09B 1/36
[52] U.S. Cl. ................................. 434/171; 446/128; 434/208; 434/403
[58] Field of Search ............... 434/171, 172, 176, 159, 434/205, 208, 403, 406, 407; 446/125, 128

[56] References Cited

U.S. PATENT DOCUMENTS

| | | | |
|---|---|---|---|
| D. 163,085 | 5/1951 | Bishop | D34/15 |
| 1,531,542 | 3/1925 | Cogshall | 434/172 |
| 2,415,342 | 2/1947 | Donner | 434/171 |
| 2,446,179 | 8/1948 | Harnquist | 446/125 |
| 2,513,596 | 7/1950 | Severson et al. | 434/208 |
| 2,839,843 | 6/1958 | Keyko | |
| 3,487,579 | 1/1970 | Brettingen | 446/128 |
| 3,659,359 | 5/1972 | Laubenstein | |
| 3,773,327 | 11/1973 | Kremer | 273/137 C |
| 3,827,162 | 8/1974 | Moeser | |
| 3,918,178 | 11/1975 | Riley | |
| 4,808,111 | 2/1989 | Pratt | 434/191 |

*Primary Examiner*—Paul J. Hirsch
*Assistant Examiner*—Jeffrey A. Smith
*Attorney, Agent, or Firm*—Ross, Clapp, Korn & Montgomery

[57] ABSTRACT

A learning system is disclosed that comprises ordered pairs of interlocking cooperatively aligned hexagonal bosses and recesses having one or more peripherally disposed lobes as control structures to influence a user to connect or assemble articles or objects in a predetermined sequence or positional relationship.

3 Claims, 3 Drawing Sheets

ALPHABET

NUMBERS

LEARNING SYSTEM WITH INTERLOCKING HEXAGONAL CONTROL STRUCTURES

BACKGROUND OF THE INVENTION

1. Field of the Invention

This invention relates to learning systems, and more particularly, to a learning system employing ordered pairs of interlocking, hexagonal control structures adapted to influence the user to assemble blocks, tracks or other objects in predetermined alphabetical or numerical sequences, or into predetermined positional relationships to produce articles, parts, or the like. The learning system of the invention is particularly useful when incorporated into educational toys for children.

2. Description of Related Art

Educational toys utilizing interlocking neutral structures such as cooperatively aligned cylindrical bosses and recesses are well known. Blocks made with such interlocking neutral structures can be snapped together, for example, to create or construct various objects, patterns or designs.

Learning systems and objects utilizing cooperatively aligned pairs of protrusions and recesses as control structures to influence a user to assemble objects in a preferred order or into a preferred positional relationship have also been disclosed, for example, in U.S. Pat. No. Des. 163,085; U.S. Pat. Nos. 3,659,359; 3,773,327; 3,827,162; 3,918,178; and 4,808,11

SUMMARY OF THE INVENTION

According to the present invention, a learning system is disclosed that comprises releasably interlocking hexagonal control structures (such as, for example, cooperatively aligned bosses and recesses) to establish preferred sequential and positional relationships between adjacent objects.

According to one preferred embodiment of the invention, a learning system is provided that comprises ordered pairs of hexagonal bosses and recesses having one or more peripherally disposed lobes as control structures to influence a user to connect or assemble articles or objects in a predetermined sequence or positional relationship.

According to another embodiment of the invention, blocks or other objects that are intended to be assembled in a predetermined order are provided with pairs of cooperatively aligned interlocking bosses and recesses having a hexagonal neutral structure that is modified by the addition of a lobe on one surface of the hexagon to create a specific control structure.

According to another embodiment of the invention, a learning system is disclosed that comprises members having at least one surface having projecting therefrom a plurality of male hexagonal neutral structures and another surface with a plurality of female modified hexagonal neutral structures, each side of each female modified hexagonal structure further comprising an outwardly extending lobe to permit engagement with a male hexagonal control structure having a lobe on at least one surface thereof.

According to another embodiment of the invention, ordered triplets of hexagonal control structures comprising hexagonal neutral structures each modified by the addition of one or more protuberant lobes are disclosed for use in establishing one-to-one correspondence between a greater number of objects or positional relationships than can be achieved through use of ordered pairs of hexagonal control structures.

BRIEF DESCRIPTION OF THE DRAWINGS

The learning system of the invention is further described and explained in relation to the following figures of the drawings wherein.

DESCRIPTION OF THE PREFERRED EMBODIMENTS

The learning system of the invention preferably utilizes ordered pairs of modified hexagonal structures that can be associated in one-to-one correspondence with characters such as letters of the alphabet, numerical digits, or the like. The modified hexagonal structures can be incorporated, for example, as a part of blocks, tracks, puzzle boards, or other objects or devices. The hexagonal structures are preferably formed as either bosses or recesses that are made by thermoforming, injection molding, or by any other suitable process, from plastic or from any other suitable material. Thus, for example, laminated cardboard such as that used in conventional puzzle or gameboard construction can also be used in making some embodiments of the invention.

According to a preferred embodiment of the invention, an ordered pair of modified hexagonal bosses is formed on one object and a congruent set of modified hexagonal recesses is formed in a second object in such manner that the bosses and recesses can be releasably engaged or interlocked to join the first and second objects in a predetermined relationship. As used herein, the term "interlocking" is generally used to refer to a friction fit between the boss and recess that is sufficiently tight to prevent the two objects from falling apart, but sufficiently loose that a child can manually separate the two objects.

As used herein, the term "hexagonal neutral structure" means either a boss or a cooperatively aligned, releasably engageable or interlockable recess that is hexagonally shaped and devoid of a protruberant modification on any side. The term "hexagonal control structure" means a hexagonal neutral structure that is modified by the addition of a protruberant lobe at one or more of the six sides.

Figure 4:
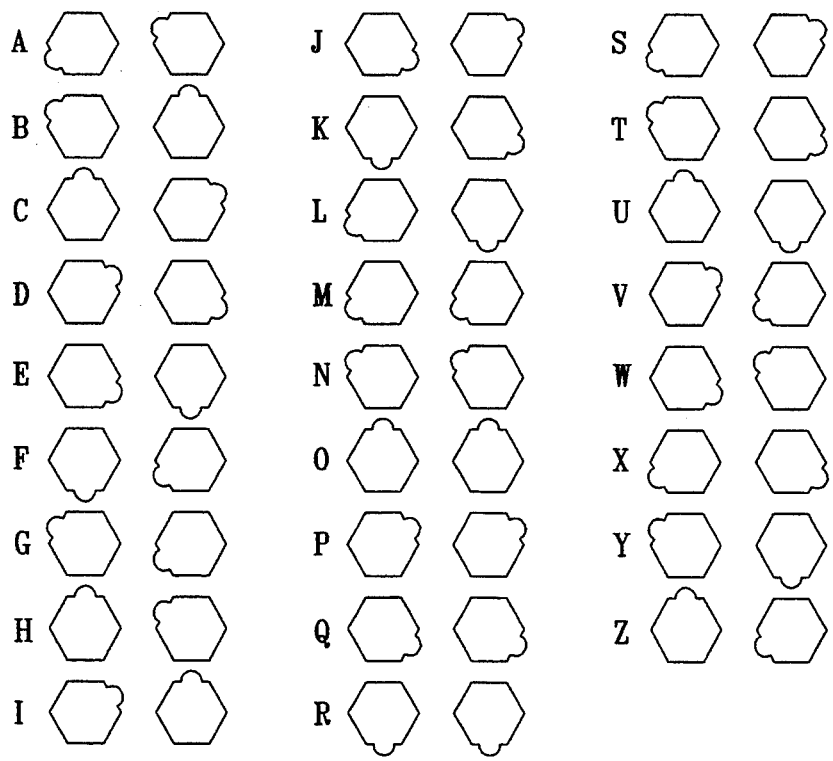
FIG. 4 is a table illustrating preferred ordered pairs of hexagonal control structures that can be used to define the letters of the alphabet.
Figure 5:
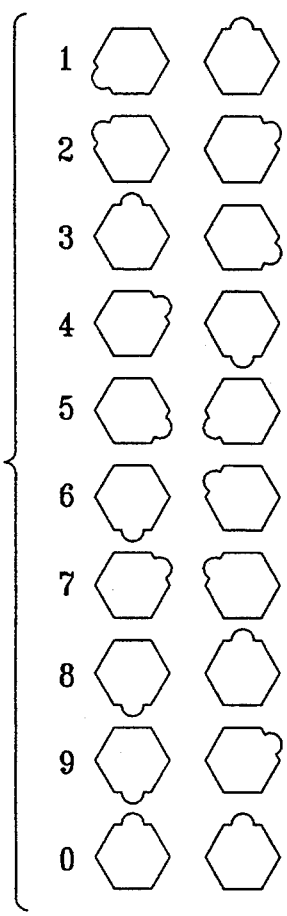
FIG. 5 is a table illustrating preferred ordered pairs of hexagonal control structures that can be used to define the numbers 0 through 9.

According to one preferred embodiment of the invention, blocks or other objects that are intended to be assembled in a predetermined sequence or order are provided with pairs of cooperatively aligned interlocking bosses and recesses having a hexagonal neutral structure that is modified by the addition of a lobe on one surface of the hexagon to create a specific control structure. Through the use of ordered pairs of hexagonal control structures, one can define 36 different ordered pairs in which each hexagonal neutral structure of each ordered pair is modified by the addition of one lobe on a particular surface of the hexagon. Thirty-six ordered pairs is a sufficient number to provide a unique hexagonal control structure for each letter of the English alphabet, as shown in FIG. 4, and for each digit from 0 through 9, as shown in FIG. 5. If desired, many more unique combinations of hexagonal control structures can be produced by using ordered triplets instead of ordered pairs, or by providing lobes on more than one side of one or all of the hexagonal control structures.

Figure 1:
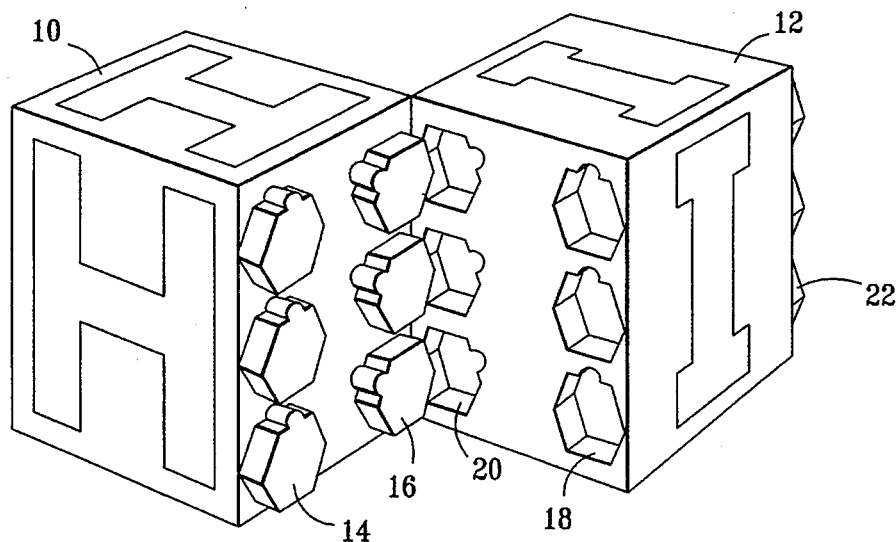
FIG. 1 is a perspective view of two blocks having cooperatively aligned repetitive pairs of hexagonal control structures.

Referring to FIG. 1, blocks 10 and 12 are so-called "alphabet blocks" that bear the letters "H" and "I", respectively, and are adapted to be releasably interlocked in alphabetical order. The right side of block 10 comprises three vertically spaced but otherwise identical ordered pairs 14, 16 of hexagonal control structures having lobe positions corresponding to the letter "H" as shown in FIG. 4. The left side of block 12 similarly comprises three vertically spaced but otherwise identical ordered pairs 18, 20 of recesses cooperatively aligned to receive bosses 14, 16 whenever blocks 10, 12 are pressed together. (Although blocks 10 and 12 could be made with only one ordered pair of cooperatively aligned bosses 14, 16 and recesses 18, 20, respectively, three vertically spaced pairs are provided to increase the stability of the joined blocks.) Barely visible on the right side of block 12 are three vertically spaced bosses 22 corresponding to the left hexagonal control structure for the letter "J" as shown in FIG. 4. It is. therefore understood that an entire series of blocks having control structures corresponding to the letters "A" through "Z" as shown in FIG. 4 can therefore be made that can only be interlocked in alphabetical order.

Figure 2:
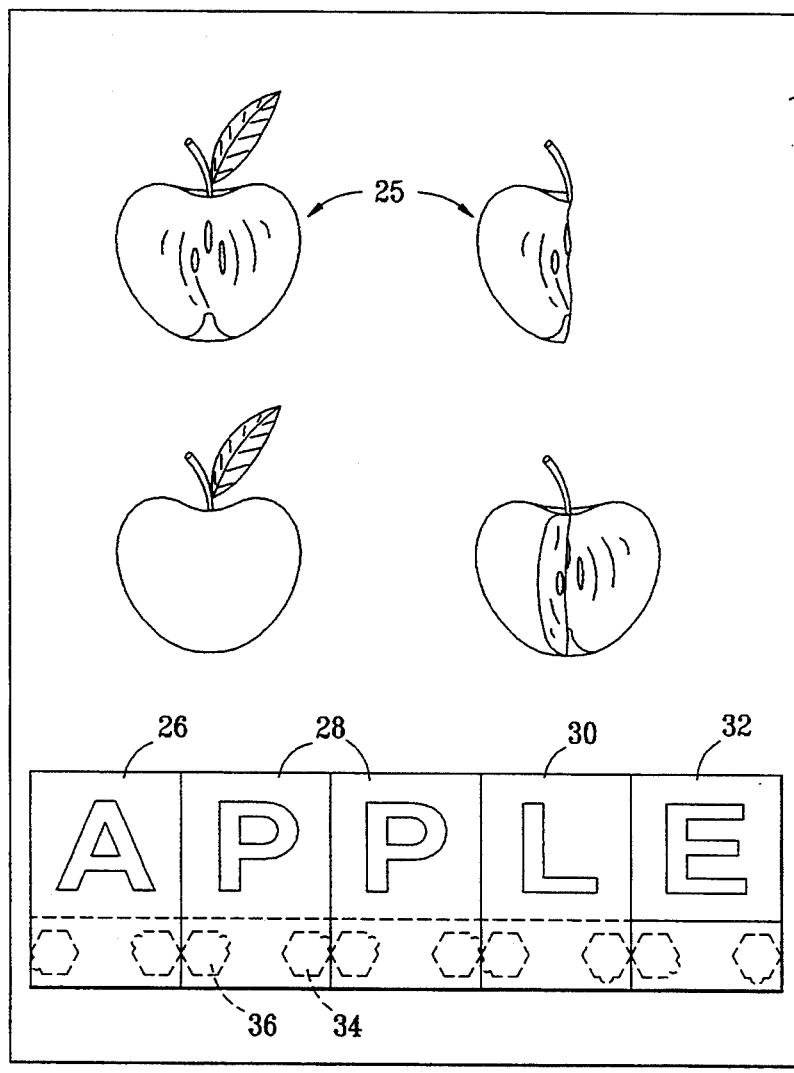
FIG. 2 is a plan view of a children's puzzle depicting letter blocks each having cooperatively aligned ordered pairs of hexagonal control structures.
Figure 2A:
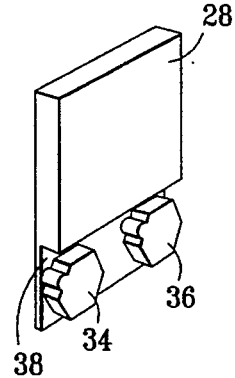
FIG. 2A is a rear perspective view of one of the letter blocks of FIG. 2 depicting the ordered pair of hexagonal control structures.

FIG. 2 depicts a child's "word board" that comprises pictures 25 of an apple together with a letter tray (disposed beneath tile word "APPLE") having hexagonal control structures adapted to receive letter blocks 26, 28, 30, 32 for the letters "A", "P", "L", and "E", respectively. Referring to FIG. 2A, which shows the back side of a letter block 28 from FIG. 2, bosses 34, 36 embody hexagonal control structures corresponding to the letter "P" as shown in FIG. 4. Bosses 34, 36 protrude beyond relieved surface section 38 and are adapted to fit into cooperatively aligned recesses on board 24. Alternatively, it will be appreciated that board 24 can instead be made with ordered pairs of bosses (not shown) that are congruent and cooperatively aligned with recesses (not shown) made in the rear of the letter blocks.

Figure 3:
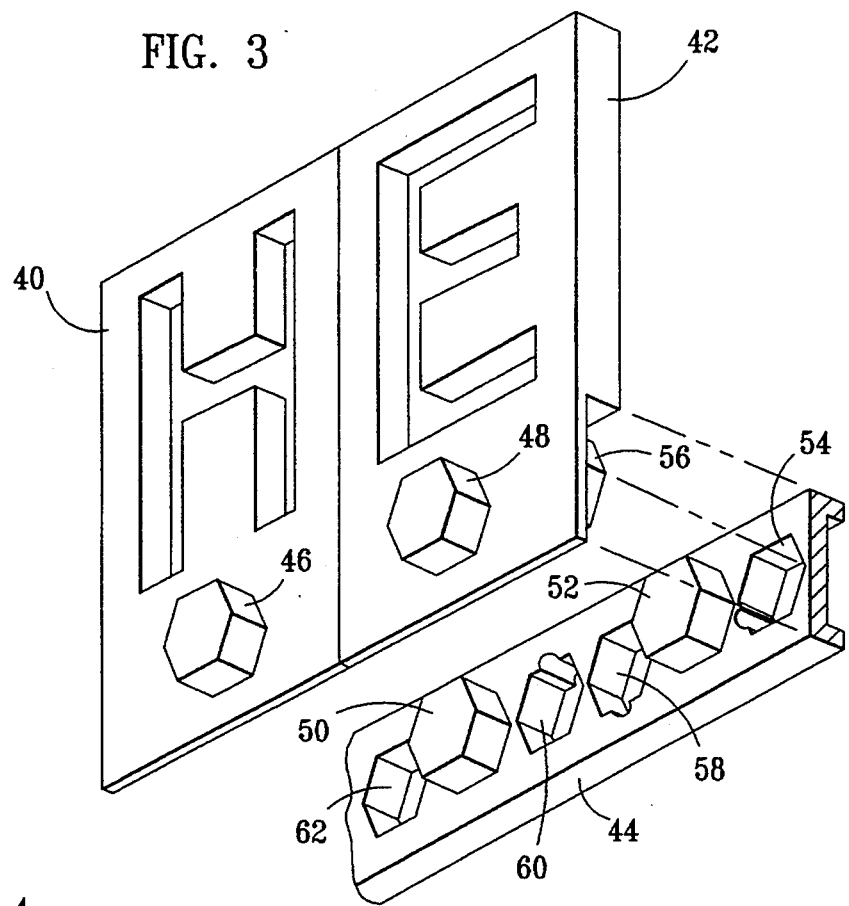
FIG. 3 is a perspective view of a track learning system depicting letter blocks and a track adapted to interlock by means of a sequence of cooperatively aligned ordered pairs of hexagonal control structures, with each ordered pair having a hexagonal neutral structure disposed between the elements of the pair.

FIG. 3 depicts another embodiment of the invention wherein letter blocks 40, 42 are each provided with a hexagonal neutral structure and with an ordered pair of hexagonal control structures that are used to attach letter blocks 40, 42 to track 44 in the proper sequential order. As shown in FIG. 3, track 44 is simply a portion of track having the hexagonal neutral structures and hexagonal control structures needed for proper placement of letter blocks 40, 42 as shown. Track 44 can be a free-standing track section or can itself be attached to a "neutral track" that is built into a table, or the like. Blocks 40, 42 comprise hexagonal neutral structures 46, 48 that are hollow bosses devoid of lobes, the undersides (not shown) of which comprise recesses adapted to receive and releasably engage bosses 50, 52, respectively, of track 44. Disposed left and right of boss 52 of track 44 are recesses 58, 54 adapted to receive a cooperatively aligned pair of bosses (of which only boss 56 is visible) having hexagonal control structures corresponding to those for the letter "E" as shown in FIG. 4. Recesses 62 and 60 are likewise provided left and right of boss 50 of track 44 to receive bosses on the underside of block 40 having an ordered pair of hexagonal control structures corresponding to those for the letter "H". In a similar manner, other tracks can be provided having hexagonal control structures permitting the attachment of other blocks for spelling out such words as may be desired, or for building predetermined sequences of letters, numbers, or the like.

Figure 6:
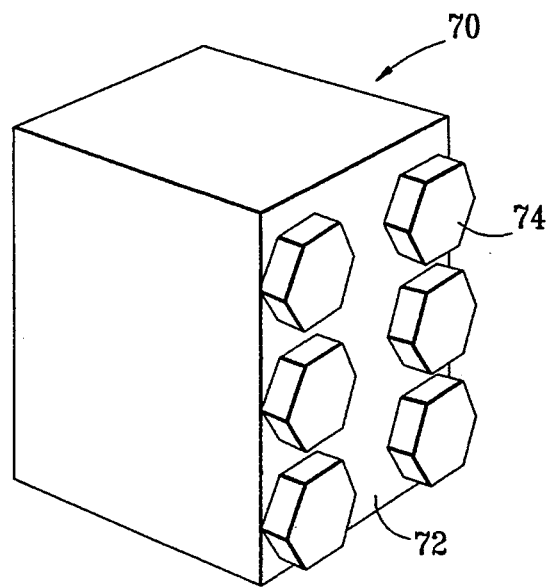
FIG. 6 is a front perspective view of a block having a plurality of male hexagonal neutral structures projecting from one side thereof.
Figure 7:
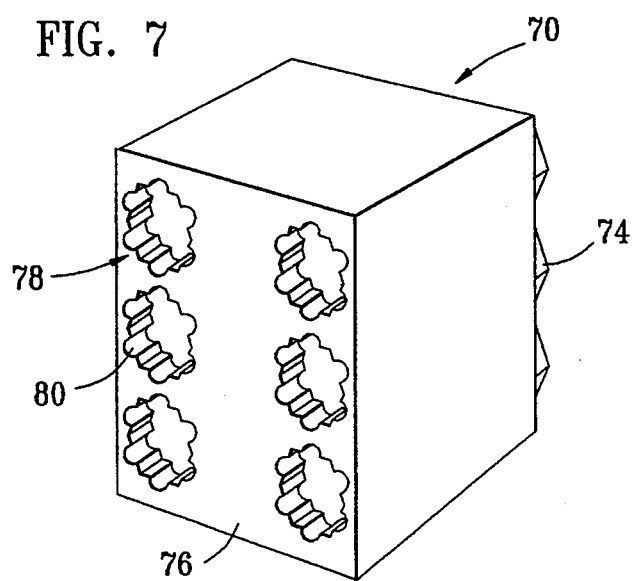
FIG. 7 is a rear perspective view of the block of FIG. 6 depicting a plurality of female modified hexagonal neutral structures recessed into one surface thereof that is opposite the surface having the male hexagonal neutral structures.

Referring to FIGS. 6 and 7, neutral blocks such as block 70 can also be provided in the learning system of the invention for use as spacers, connectors, operators, construction aids, or the like. As shown in FIGS. 6 and 7, block 70 preferably comprises at least one surface 72 having a plurality of male hexagonal neutral structures 74 that project outwardly from the surface, and at least one surface 76 having a plurality of female modified neutral hexagonal structures 78 recessed into surface 76. The female neutral structures 78 are preferably modified by incorporating on each surface of each hexagonal recess a recessed lobe 80 that is adapted to receive, and most preferably, frictionally engage any protruding or projecting hexagonal control structure as described above in relation to the other figures of the drawings.

It will be appreciated upon reading this disclosure that unique hexagonal control structures can be created for particular objects or symbols as well as for letters and numbers within the scope of the invention. So-called "neutral objects" having hexagonal neutral structure(s) but no hexagonal control structures can also be utilized in combination with objects bearing hexagonal control structures. It will also be appreciated that where blocks or tracks embodying the learning system of the invention are made of plastic, rubber or other polymeric materials, such blocks can be molded in solid form or can be molded with a hollow construction to reduce weight and to facilitate cooling of the molded product.

While the preferred devices disclosed herein relate primarily to educational toys for children, it will now be apparent that the hexagonal control structures disclosed herein are likewise applicable for use in joining other objects in preferred positional or sequential relationships. Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

I claim:

1. A learning system comprising at least two objects having cooperatively aligned, releasably interlocking hexagonal control structures for joining the objects in a predetermined sequential and positional relationship, the hexagonal control structures comprising ordered pairs of hexagonal bosses and recesses having one or more peripherally disposed protuberant lobes.

2. A learning system comprising at least two objects having cooperatively aligned, releasably interlocking hexagonal control structures for joining the objects in a predetermined sequential and positional relationship, the hexagonal control structures comprising ordered triplets of hexagonal bosses and recesses having one or more peripherally disposed protuberant lobes.

3. A learning system comprising at least two objects having cooperatively aligned, releasably interlocking hexagonal control structures for joining the objects in a predetermined sequential and positional relationship, the learning system further comprising at least one neutral object having at least one surface with a plurality of male hexagonal neutral structures projecting outwardly from the surface, and at least one other surface having a plurality of female modified neutral hexagonal control structures recessed into said other surface, each female modified neutral hexagonal control structure having six sides and each side incorporating a recessed lobe.

* * * * *